United States Patent
Ino

(10) Patent No.: US 11,433,299 B2
(45) Date of Patent: *Sep. 6, 2022

(54) METHOD FOR CONTROLLING SERVER DEVICE, SERVER DEVICE, COMPUTER-READABLE RECORDING MEDIUM AND GAME SYSTEM

(71) Applicant: GREE, INC., Tokyo (JP)

(72) Inventor: Yuki Ino, Tokyo (JP)

(73) Assignee: GREE, Inc., Tokyo (JP)

( * ) Notice: Subject to any disclaimer, the term of this patent is extended or adjusted under 35 U.S.C. 154(b) by 13 days.

This patent is subject to a terminal disclaimer.

(21) Appl. No.: 15/841,669

(22) Filed: Dec. 14, 2017

(65) Prior Publication Data

US 2018/0104579 A1    Apr. 19, 2018

Related U.S. Application Data

(63) Continuation of application No. 15/491,349, filed on Apr. 19, 2017, now Pat. No. 9,873,044, which is a
(Continued)

(30) Foreign Application Priority Data

Jul. 22, 2013 (JP) .................. 2013-152162

(51) Int. Cl.
*A63F 13/332* (2014.01)
*A63F 13/795* (2014.01)
(Continued)

(52) U.S. Cl.
CPC .......... *A63F 13/332* (2014.09); *A63F 13/795* (2014.09); *A63F 13/822* (2014.09);
(Continued)

(58) Field of Classification Search
CPC .... A63F 13/332; A63F 13/795; A63F 13/822; A63F 13/847; G06Q 30/02;
(Continued)

(56) References Cited

U.S. PATENT DOCUMENTS

2002/0055386 A1   5/2002  Yotsugi et al.
2006/0041443 A1*  2/2006  Horvath, Jr. .......... G06Q 30/02
                                                         358/1.18
(Continued)

FOREIGN PATENT DOCUMENTS

JP     2002-143567 A    5/2002
JP     2009-112587 A    5/2009
(Continued)

OTHER PUBLICATIONS

Office Action dated Nov. 27, 2018 in corresponding Japanese Application No. 2017-079646; 6 pages including English-language translation.
(Continued)

*Primary Examiner* — Werner G Garner
(74) *Attorney, Agent, or Firm* — Maier & Maier, PLLC

(57) ABSTRACT

To enhance motivation of a player to invite another player to a social game, thus activating the social game and a platform that provides the social game, a server device includes incentive giving means that gives an incentive to a player who operates a first terminal device when a player of a second terminal device that receives, from the first terminal device, invitation information including solicitation information to at least suggest participating in the game and specific information to at least specify a landing screen associated with a home screen of the game operates the second terminal device to access the landing screen on a basis of the specific information.

24 Claims, 7 Drawing Sheets

Related U.S. Application Data continuation of application No. 14/338,030, filed on Jul. 22, 2014, now Pat. No. 9,662,573.

(51) Int. Cl.
    *A63F 13/822*     (2014.01)
    *A63F 13/847*     (2014.01)
    *G06Q 30/02*     (2012.01)

(52) U.S. Cl.
CPC ............ *A63F 13/847* (2014.09); *G06Q 30/02* (2013.01); *G06Q 30/0207* (2013.01); *G06Q 30/0208* (2013.01); *G06Q 30/0209* (2013.01); *G06Q 30/0214* (2013.01); *G06Q 30/0235* (2013.01); *G06Q 30/0236* (2013.01); *G06Q 30/0255* (2013.01); *G06Q 30/0256* (2013.01)

(58) Field of Classification Search
CPC .......... G06Q 30/0207; G06Q 30/0208; G06Q 30/0209; G06Q 30/0214; G06Q 30/0235; G06Q 30/0236; G06Q 30/0255; G06Q 30/0256

See application file for complete search history.

(56) References Cited

U.S. PATENT DOCUMENTS

| | | | |
|---|---|---|---|
| 2007/0099683 A1* | 5/2007 | Panther Trice | G06Q 30/02 463/1 |
| 2009/0239666 A1 | 9/2009 | Hall et al. | |
| 2011/0098156 A1* | 4/2011 | Ng | G06Q 10/02 482/8 |
| 2012/0064969 A1 | 3/2012 | Uchibori | |
| 2012/0232973 A1* | 9/2012 | Robb | G06Q 50/01 705/14.17 |
| 2014/0279420 A1* | 9/2014 | Okerlund | G06Q 40/00 705/39 |

FOREIGN PATENT DOCUMENTS

| | | |
|---|---|---|
| JP | 2013-009818 A | 1/2013 |
| JP | 2013-13445 A | 1/2013 |
| JP | 2013-066524 A | 4/2013 |
| JP | 2013-081760 A | 5/2013 |
| JP | 2013081760 A | 5/2013 |
| JP | 2015019986 A | 2/2015 |

OTHER PUBLICATIONS

Paper: Patent Owner Preliminary Response To Petition For Post Grant Review of U.S. Pat. No. 9,873,044, entered Oct. 17, 2018, in connection with USPTO, PTAB, *Supercell Oy*, Petitioner, v. *Gree, Inc.*, Patent Owner, Case PGR2018-00066, U.S. Pat. No. 9,873,044, 84 pages.
Gree Inc. Exhibit 2003: Curriculum Vitae of David Crane, in connection with USPTO, PTAB, *Supercell Oy*, Petitioner, v. *Gree, Inc.*, Patent Owner, Case PGR2018-00066, U.S. Pat. No. 9,873,044, 7 pages.
Gree Inc. Exhibit 2002: Declaration of David Crane, in connection with USPTO, PTAB, *Supercell Oy*, Petitioner, v. *Gree, Inc.*, Patent Owner, Case PGR2018-00066, U.S. Pat. No. 9,873,044, 15 pages.
Office Action dated May 15, 2018 of corresponding Japanese application No. 2017-079646; 9 pgs.
"Lineage II" Summer Friends Referral Campaign, Published: Jul. 18, 2008 [online], Searched: Apr. 27, 2018, URL: <https://www.famitsu.com/pcent/news/1216805_1341 .html>, 5 pgs.
Gree Inc. Exhibit 2002: Curriculum Vitae of David Crane, in connection with USPTO, PTAB, *Supercell Oy*, Petitioner, v. *Gree, Inc.*, Patent Owner, Case PGR2018-00037, U.S. Pat. No. 9,662,573, 6 pages.
Paper: Decision Denying Institution of Post-Grant Review, entered Sep. 4, 2018, in connection with USPTO, PTAB, *Supercell Oy*, Petitioner, v. *Gree, Inc.*, Patent Owner, Case PGR2018-00037, U.S. Pat. No. 9,662,573, 33 pages.
Paper: Patent Owner's Preliminary Response to Petition for Post Grant Review of U.S. Pat. No. 9,662,573, dated Jun. 18, 2018, in connection with USPTO, PTAB, *Supercell Oy*, Petitioner, v. *Gree, Inc.*, Patent Owner, Case PGR2018-00037, U.S. Pat. No. 9,662,573, 71 pp.
Gree, Inc. Exhibit 2001: Declaration of David Crane, in connection with USPTO, PTAB, *Supercell Oy*, Petitioner, v. *Gree, Inc.*, Patent Owner, Case PGR2018-00037, U.S. Pat. No. 9,662,573, (17 pgs.).
Supercell Exhibit 1003: Google dictionary web pages for: 1. Detect; 2. enable; 3. incentive; and 4. reward, (4 pgs.).
Supercell Exhibit 1004: Memorandum letter dated May 19, 2016, From: Robert W. Bahr, Deputy Commissioner for Patent Examination Policy; To: Patent Examining Corps; Subjec: "Recent Subject Matter Eligibility Decisions (*Enfish, LLC* v. *Microsoft Corp, and TLI Communications LLC* v. *A. V. Automotive, LLC*)", 2 pgs.
Supercell Exhibit 1005: Memorandum letter dated Nov. 2, 2016, From: Robert W. Bahr, Deputy Commissioner for Patent Examination Policy; To: Patent Examining Corps; Subject: "Recent Subject Matter Eligibility Decisions", 4 pgs.
Supercell Exhibit 1006: "Subject Matter Eligibility Examples: Business Methods", dated Dec. 2016, 17 pgs.
Paper: "Petition for Post Grant Review of U.S. Pat. No. 9,662,573", dated Feb. 27, 2018, *Supercell Oy* v. *Gree, Inc.*, filed by Fenwick & West LLP on behalf of Supercell Oy, 76 pgs.
Paper: "Petition for Post Grant Review of U.S. Pat. No. 9,873,044", dated Jun. 7, 2018, *Supercell Oy* v. *Gree, Inc.*, filed by Fenwick & West LLP on behalf of Supercell Oy, 81 pgs.
Supercell Exhibit 1007: Laura J. Kornish, et al., "Optimal Referral Bonuses with Asymmetric Information: Firm-Offered and Interpersonal Incentives", in Marketing Science, vol. 29, No. 1, Jan.-Feb. 2010, pp. 108-121 (14 pgs.).
Supercell Exhibit 1008: Philipp Schmitt, et al., "Referral Programs and Customer Value", in Journal of Marketing, vol. 75, Jan. 2011, pp. 46-59 (14 pgs.).
Supercell Exhibit 1009: Memorandum letter dated Apr. 19, 2018, From: Robert W. Bahr, Deputy Commissioner for Patent Examination Policy; To: Patent Examining Corps; Subject: Changes in Examination Procedure Pertaining to Subject Matter Eligibility, Recent Subject Matter Eligibility Decision (*Berheimer* v. *HP, Inc.*), 5 pgs.
Paper: Decision Denying Institution of Post-Grant Review, entered Dec. 17, 2018, in connection with USPTO, PTAB, *Supercell Oy*, Petitioner, v. *Gree, Inc.*, Patent Owner, Case PGR2018-00066, U.S. Pat. No. 9,873,044 B2, 34 pages.
Japanese Office Action dated Aug. 28, 2018 of corresponding Application No. JP2017-079646; 8 pgs.
"Reconsideration Report by Examiner before Appeal" dated on Mar. 22, 2019, in corresponding Japanese Application No. 2017-079646; 8 pages.
Japanese Office Action dated Feb. 5, 2020, in corresponding Japanese Application No. 2019-022248; 6 pages.
Ai Sp@ce, Famitsu Connect! On, vol. 40, Enterbrain Inc., Mar. 13, 2010, p. 66, 3 pgs.
Japanese Office Action dated Sep. 23, 2020, in corresponding Japanese Application No. 2019-022248; 8 pages.

\* cited by examiner

METHOD FOR CONTROLLING SERVER DEVICE, SERVER DEVICE, COMPUTER-READABLE RECORDING MEDIUM AND GAME SYSTEM

CROSS-REFERENCE TO RELATED APPLICATIONS

This application is a continuation of U.S. patent application Ser. No. 15/491,349, filed Apr. 19, 2017, which is a continuation of U.S. patent application Ser. No. 14/338,030, filed Jul. 22, 2014, now U.S. Pat. No. 9,662,573, which claims priority benefit of Japanese Patent Application No. 2013-152162, filed Jul. 22, 2013, the disclosures of which are incorporated herein in their entirety by reference.

BACKGROUND

Disclosed herein are a method for controlling a server device, a server device, a computer-readable recording medium, and a game system.

Recently games that are provided from a server device via a communication network to mobile terminals that players are operating have become a hit, and a lot of game titles have been released from a plurality of platforms. There are a wide variety of types and categories of these games, among which social games allowing a plurality of players to participate in the same game are particularly enjoying a boom. Such a social game can be said to use a community-forming network service called a social networking service (SNS).

A known social games utilizing the features of a SNS is configured to let characters (player characters) manipulated by a plurality of players attack one or a plurality of enemy characters to develop a fighting event such as a battle (combat). In this case, each player becomes a member of a specific group such as a guild, a party, a team or a community, which will be described later, to beat an enemy character, whereby various rewards such as a point or an item that can be used in the game can be given not only the individual players but also to groups to which the players belong.

Such a fighting event to beat an enemy character by a plurality of player characters is conventionally called a "raid battle" in the field of social games. In such a fighting event, a group or a guild is represented with its first letter (G), and an enemy character in a raid battle as a raid character is represented with its first letter (R). Then, such a fighting event is sometimes called a "GvR" (v denotes versus, the same applies in the following).

Another social game that is widely known offers an individual fighting event that is a one for one fighting of player characters and a group fighting event that is a battle between groups (including not only battles but also competitions such as a team sport). As one example of the latter, JP2013-66524A describes an online game, in which when matching of a plurality of parties, to which player characters belong, is established in a coliseum hall as a predetermined virtual space in the game, a group fighting (battle) between the parties is performed. Such a direct fighting between groups is conventionally called a "guild battle" in the field of social games, or may be called "GvG" represented with the first letters (G) of the group or the guild as stated above.

SUMMARY

A method for a player to participate in such a social game comprises accessing a platform to operate a social game and find the social game for participation, or being invited from another player who participates in the social game. For instance, a member who registered with a platform receives invitation mail to the social game from another player, and the member receiving the mail may participate in the social game as a player via the invitation mail.

In this way, a player may transmit invitation mail to another player because, when the other player participates in the social game via the invitation mail, the player transmitting the invitation mail will get a predetermined incentive. Herein, the incentive given may be a coin or precious items such as a rare item that can be used in the social game. That is, the player can play the social game favorably by using such a coin or an item given as the incentive. In order to acquire such an incentive, a player registered as a member transmits invitation mail to another player the player gets to know in the platform to suggest participating in the social game. Since a certain number of players will participate in the social game because of such invitation mail, the social game and the platform providing the social game will become active.

Such a social game is configured to give an incentive after the player invited participates in (registers) the social game. That is, when a player transmits invitation mail to many other players, if such other players do not participate in the social game as a player, the player cannot receive an incentive. That is why, even when the player transmits invitation mail to may other players, the ratio of the players who participate in the social game as a player is not high. As a result, since a coin or the like that the player can get as an incentive is small relative to the effort of transmitting the invitation mail, they will stop transmitting invitation mail because they find transmitting invitation mail troublesome. The number of players who never transmit invitation mail also is not small. Further, since such invitation mail is transmitted to registered members in the platform, the destination of the invitation mail also is limited. In such a situation, there is a limit to increase the number of players who participate in the social game by the system to invite other players, and so it is difficult to increase the number of players who participate in the social game to activate the social game or the platform providing the social game more.

In view of such a circumstance, embodiments provide a method for controlling a server device, a server device, a computer-readable recording medium, and a game system, which are capable of enhancing the motivation of a player to invite other players to a social game, thus activating the social game and a platform providing the social game.

In order to solve the above-stated problems, a method for controlling a server device according to preferred embodiments provides a game, in which a plurality of players can participate, and that is connected to terminal devices operated by the players via a communication line, and the method comprises giving an incentive to a player who operates a first terminal device when a player of a second terminal device that receives, from the first terminal device, invitation information including solicitation information to at least suggest participating in the game and specific information to at least specify a landing screen associated with a home screen of the game operates the second terminal device to access the landing screen on a basis of the specific information.

A server device according to preferred embodiments provides a game, in which a plurality of players can participate, and that is connected to terminal devices operated by the players via a communication line, and the server device comprises: incentive giving means that gives an incentive to a player who operates a first terminal device when a player of a second terminal device that receives, from the first terminal device, invitation information including solicitation information to at least suggest participating in the game and specific information to at least specify a landing screen associated with a home screen of the game operates the second terminal device to access the landing screen on a basis of the specific information.

A computer-readable recording medium according to preferred embodiments can be readable by a computer that provides a game, in which a plurality of players can participate, and that is connected to terminal devices operated by the players via a communication line. The recording medium that is not temporal and is tangible has stored thereon a computer program to implement incentive giving means that gives an incentive to a player who operates a first terminal device when a player of a second terminal device that receives, from the first terminal device, invitation information including solicitation information to at least suggest participating in the game and specific information to at least specify a landing screen associated with a home screen of the game operates the second terminal device to access the landing screen on a basis of the specific information.

A game system according to preferred embodiments comprises: a server device that provides a game, in which a plurality of players can participate, and that is connected to terminal devices operated by the players via a communication line; and the terminal devices, and the game system further comprises: incentive giving means that gives an incentive to a player who operates a first terminal device when a player of a second terminal device that receives, from the first terminal device, invitation information including solicitation information to at least suggest participating in the game and specific information to at least specify a landing screen associated with a home screen of the game operates the second terminal device to access the landing screen on a basis of the specific information.

Herein, the "player" refers to a user who operates a terminal device, which is a concept corresponding to a client of a client-server system as well, and from the viewpoint of distinguishing it from a user of a server device (a server administrator or the like), this is referred to as a "player". A player typically can participate in a game through a character that acts, behaves, thinks and the like in a virtual game space or an appropriate game medium that is associated with the character (hereinafter this is called a "player character" in combination) instead of the player himself/herself. In this way, a "player" in the present disclosure mainly represents a player character strictly, and this may be described simply as a "player" in the following.

The method for controlling the server device, the server device, the computer-readable recording medium and the game system of the preferred embodiments can enhance motivation of a player to invite another player to a social game, whereby the social game and a platform that provides the social game can be activated.

DETAILED DESCRIPTION

Figure 1:
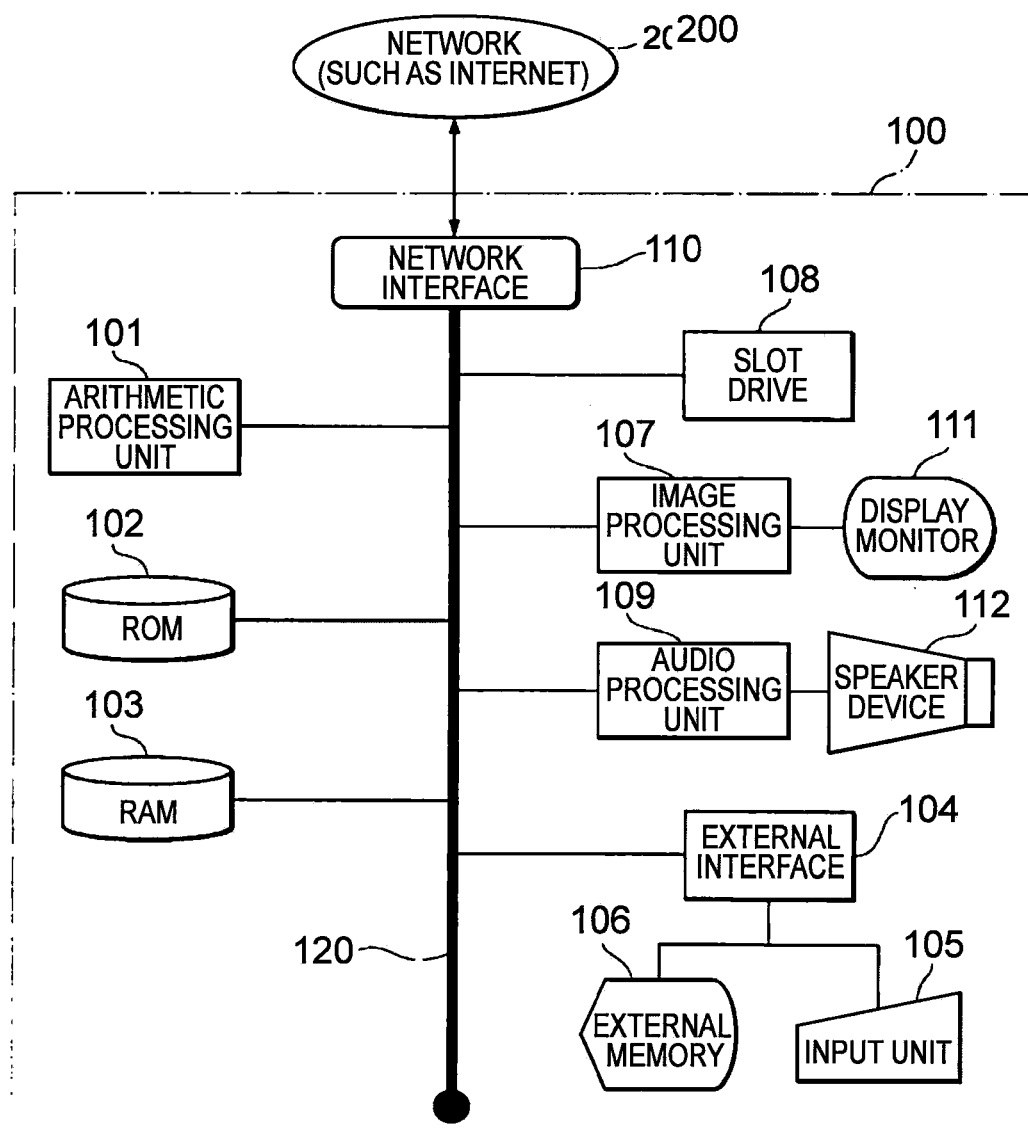
FIG. 1 schematically illustrates (system block diagram) the structure of a server device that is a preferred embodiment of the invention.

The following describes embodiments of the invention in detail. The following embodiments illustrate the invention disclosed herein for description, and are not intended to limit the invention to the embodiments only. The invention disclosed herein can be modified variously as long as its gist is not changed. A person skilled in the art can use embodiments that are obtained by replacing the following elements with their equivalents, and such embodiments also are included in the scope of the invention disclosed herein. The positional relationship such as vertical and horizontal described as needed is based on the illustration of the drawings unless otherwise designated. The ratios of the dimensions in the drawings are not limited to the illustrated one. The following exemplifies an embodiment by way of an information processing device for games for easy understanding, and the invention disclosed herein is not limited to this as stated above.

Figure 2:
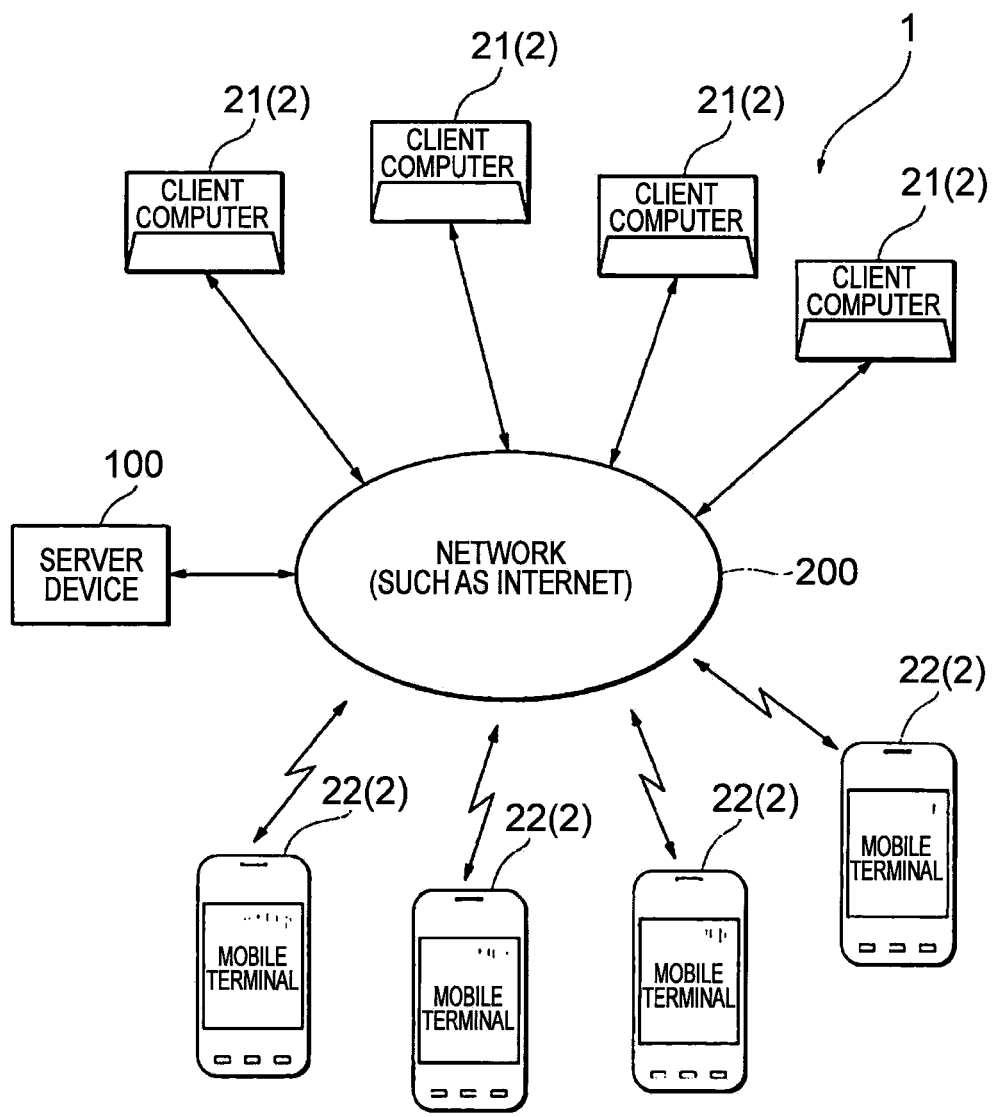
FIG. 2 schematically illustrates (system configuration diagram) the structure of a game system that is a preferred embodiment.

FIG. 1 schematically illustrates (system block diagram) the structure of a server device that is a preferred embodiment of the invention. FIG. 2 schematically illustrates (system configuration diagram) the structure of a game system that is a preferred embodiment of the invention. As illustrated in these drawings, a server device 100 is a server computer that is connected to a network 200, and implements a server function through the operation of a predetermined server program in the server computer. The server device 100 and terminal devices 2 such as client computers 21 and mobile terminals 22 similarly connected to the network 200 in a wired or wireless manner are configured mutually-communicably, whereby a game system 1 is configured.

The network 200 is a communication line or a communication network relating to information processing such as the Internet, for example. The specific configuration thereof is not limited especially as long as it is configured so as to enable exchange of data between the server device 100 and the terminal devices 2. For instance, the network 200 may comprise a base station that is wirelessly connected to a terminal device 2, a mobile communication network connected to the base station, the Internet connected to the server device, and a gateway device that connects the mobile communication network and the Internet.

The server device 100 comprises an arithmetic processing unit 101 such as a CPU or a MPU, a ROM 102 and a RAM 103 as storage devices, an external interface 104 connected to an input unit 105 and an external memory 106, an image processing unit 107 connected to a display monitor 111, a slot drive 108 containing or connected to a disk, a memory device or the like, an audio processing unit 109 connected to a speaker device 112, and a network interface 110, which are mutually connected via a transmission line 120 such as a system bas including an internal bas, an external bas, and an expansion bus. Devices for inputting/outputting such as the input unit 105, the external memory 106, the display monitor 111 and the speaker device 112 may be omitted as needed, and even when they are included, they may not be always connected to the transmission line 120.

The arithmetic processing unit 101 controls the overall operation of the server device 100, transmits/receives control signals and information signals (data) among the above-stated elements, and performs various types of arithmetic processing that is necessary for execution of a game. To this end, the arithmetic processing unit 101 is configured to be capable of performing, to a fast accessible storage area such as a register, arithmetic operations such as addition, subtraction, multiplication and division, logical operations such as logical OR, logical AND and logical NOT, and bit operations such as bitwise OR, bitwise AND, bit inversion, bit shift and bit rotation using an arithmetic logical unit as well as saturation calculation, trigonometric function calculation, vector calculation and the like as needed.

The ROM 102 contains an Initial Program Loader (IPL) recorded therein that is typically executed firstly after power activation. Following the execution of this IPL, a server program and a game program recorded in the disk or the memory device contained in or connected to the slot drive 108 is once read by the arithmetic processing unit 101 in the RAM 103, and such a program is executed by the arithmetic processing unit 101. The server program comprises a platform program to display a platform on each terminal device 2 that is used by a provider who provides a game (e.g., a providing company that provides a platform to operate a social game, i.e., an application) to provide various types of games and an incentive giving program described later, for example. The ROM 102 further contains a program of the operating system that is necessary for the overall operation control of the server device 100 and other various types of data recorded therein.

The RAM 103 is to temporarily store a server program, a game program, and various types of data. The RAM 103 holds the server program and the game program that are read as stated above and data necessary to advance a game or to establish a communication among a plurality of terminal devices 2, for example. The arithmetic processing unit 101 sets the range of variables for the RAM 103 and directly performs arithmetic operations using an arithmetic logical unit to values stored at the range of variables, or copies or moves the values stored in the RAM 103 to a register once for storage, directly performs arithmetic operations to the register and then writes the result of the operation back to the RAM 103.

The input unit 105 connected via the external interface 104 receives various operations for inputting that a user (provider of a game) of the server device 100 performs. The input unit 105 may comprise a keyboard, a touch pad or a touch panel as well as an audio input device, for example, and the types of the devices are not limited especially as long as it enables various operations for inputting, decision operations, cancel operations, input of instructions such as menu display and the like.

The RAM 103 and the external memory 106 that is connected detachably via the external interface 104 store data indicating operation states of the server device 100, access states of the terminal devices 2, and play states and progressing states (historical record and the like) of a game at each terminal device 2, a log (record) of communications among the terminal devices 2 and the like, which are stored in a rewritable manner.

The image processing unit 107 records various types of data in a frame memory or the like that are read from the slot drive 108 and are subjected to processing by the arithmetic processing unit 101 or the image processing unit 107 itself to be image information. Such image information recorded in the frame memory is converted into a video signal at a predetermined synchronizing timing, and is output to the display monitor 111 connected to the image processing unit 107. This enables display of various types of images. Image information relating to a game is sent out from the image processing unit 107 and/or the arithmetic processing unit 101 to each terminal device 2 by the cooperative processing with the arithmetic processing unit 101 and the like.

The audio processing unit 109 converts various types of data read from the slot drive 108 into audio signals, and outputs it from the speaker device 112 connected to the audio processing unit 109. Audio information (sound effects and song information) relating to a game is sent out from the audio processing unit 109 and/or the arithmetic processing unit 101 to each terminal device 2 by the cooperative processing with the arithmetic processing unit 101 and the like.

The network interface 110 is to connect the server device 100 to the network 200. The network interface 110 comprises an interface complying with various standards used for the configuration of a LAN, modems such as an analog modem, an ISDN modem, an ADSL modem and a cable model for connection to the Internet or the like using a cable television line, and the interface for connection of them to the arithmetic processing unit 101 via the transmission line 120.

Figure 3:
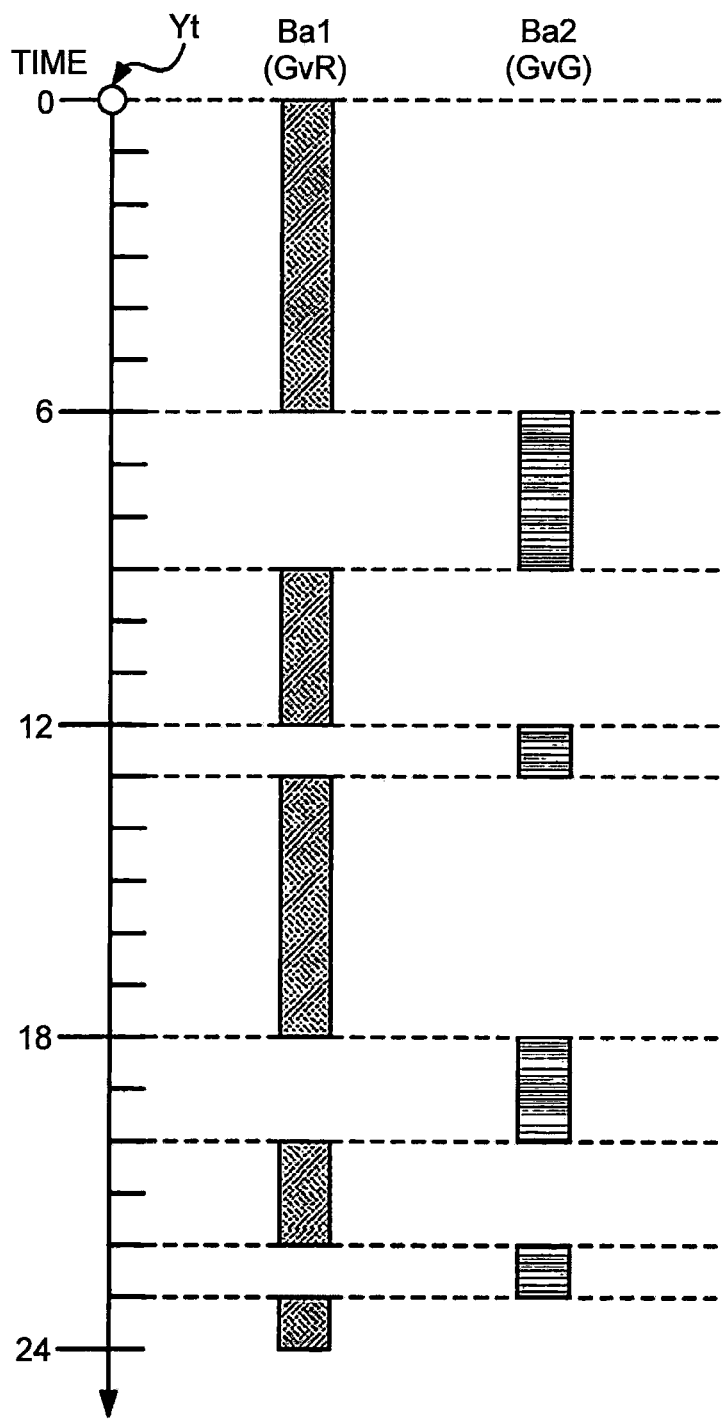
FIG. 3 is a conceptual diagram illustrating one exemplary time table of a game that is executed in the server device of FIGS. 1 and 2.
Figure 4:
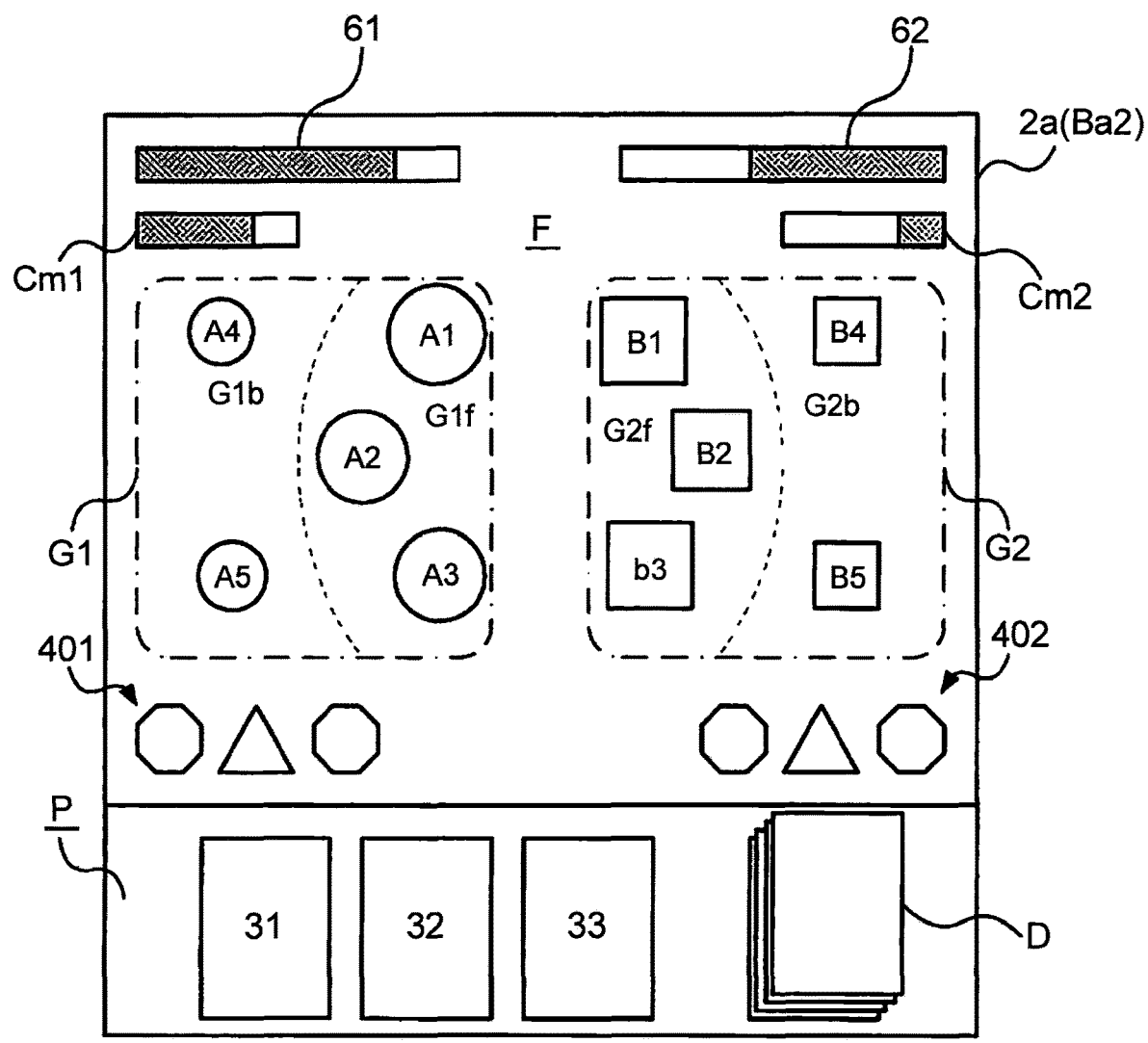
FIG. 4 schematically illustrates an exemplary configuration of a game screen in the game of FIG. 3.

The following describes a game (social game) that is executed in accordance with a game program as a preferred embodiment in the thus configured game system 1 and server device 100. FIG. 3 is a conceptual diagram illustrating one exemplary time table of a game that is executed in the server device 100. FIG. 4 schematically illustrates an exemplary configuration of a game screen in the social game of FIG. 3. The present embodiment is applied to a game described with reference to FIGS. 3 and 4, and the invention disclosed herein is not limited to this game and is applicable to various games.

Various types of processing (display of images and screens, determination, arithmetic operations and the like) in the following procedure are executed in accordance with a control instruction by the arithmetic processing unit 101 of the server device 100.

This game comprises mutually different fighting events Ba1 and Ba2, and in the present embodiment, these fighting events Ba1 and Ba2 are continuously performed without interruption from 0 a.m. to 24 p.m. as shown in the temporal axis Yt in FIG. 3. The server device 100 is in a state capable of delivering these fighting events Ba1 and Ba2 to a terminal device 2 of a player in accordance with predetermined schedule and time-series algorithm.

The player operates the terminal device 2 (e.g., a client computer 21 or a mobile terminal 22 (tablet terminal, smartphone or the like)) to connect the terminal device 2 to the server device 100 via the network 200 such as the Internet. Then, the player operates the terminal device 2 to select this game provided from the server device 100, or inputs login information such as an ID number or a password at a platform screen shown prior to the selection of the game. When the arithmetic processing unit 101 of the server device 100 recognizes the login information, the terminal device 2 displays a my-screen or a my-Home screen specific to the player that is associated with the ID number. In some types of games, the my-screen displays a banner listing a plurality of scenes (e.g., location, dungeon, quest and the like) that is set as a game scene. The scenes such as the location, the dungeon and the quest may be or may not be in the form of hierarchy mutually or as individual structures.

In the case of this game, the arithmetic processing unit 101 of the server device 100 displays, on the my-screen or the my-home screen, a menu screen relating to the aforementioned "guild" that is a group to which individual players belong. A player who played the game before or have experience of participating in the game basically belongs to one guild, and information thereon is stored at an information storage unit such as the ROM 102 while being associated with specific information such as the ID information of the player. Based on the information, the arithmetic processing unit 101 then displays information on the guild to which the player belongs and an edit menu or the like relating to the guild as needed on the terminal device 2.

On the other hand, when the player plays the game for the first time or participates in the game for the first time, the player does not belong to a specific guild. Then, the arithmetic processing unit 101 displays a menu screen on the terminal device 2 of the player who does not belong to a guild to let the player to search for (retrieve) a guild or to create (establish) a new guild. The player operates the terminal device 2 in accordance with an instruction in a pull-down menu or the like that is successively displayed from the menu screen and so can decide or create a guild to participate in.

After deciding or selecting a guild to which the player belongs, a list of a plurality of games and events is displayed on the terminal device 2 as needed, and the player may select to participate in the game. Then, the screen of a game event that is being performed at that time is displayed on the terminal device 2 of the player. This allows the player to freely participate in the game event that is being held at that time. At this time, the terminal device 2 of the player may display a preparation screen or an introduction screen of various types of game events, which may be a still image or a moving image (flash, for example).

As stated above, in one example shown in FIG. 3, the server device 100 always executes any one of the fighting events Ba1 and Ba2. For instance, in the case where the login time to the game is any one of from 0 a.m. to 6 a.m., from 9 a.m. to 12 a.m., from 1 p.m. to 6 p.m., from 8 p.m. to 10 p.m. and from 11 p.m. to 12 p.m. (0 a.m. in the next date), fighting event Ba1 is held in this game community. In the case where the login time to the game is any one of from 6 a.m. to 9 a.m., from 12 a.m. to 1 p.m., from 6 p.m. to 8 p.m., and from 10 p.m. to 11 p.m., fighting event Ba2 is held in this game community. In this way, the arithmetic processing unit 101 is configured to execute the processing of the fighting event Ba1 or Ba2 to be held in accordance with the predetermined schedule.

Between these fighting events Ba1 and Ba2, the fighting event Ba1 is a raid battle, i.e., a battle between guild G1 to which the player belongs and a raid as an enemy player character (corresponding to the aforementioned GvR). On the other hand, the fighting event Ba2 is a guild battle, i.e., a battle between guilds G1 and G2 to which players belong (corresponding to the aforementioned GvG).

Referring next to FIG. 4, one example of the fighting event Ba2 (GvG; guild battle) at the starting of the execution that is displayed on the terminal device 2 of each player is described below. The processing procedure of this fighting battle Ba2 (this may be called a quest, a turn or the like depending on game titles: the same applies to the fighting event Ba1) begins with defining an event field F and a pallet P as display areas of the game image on a screen 2a of the terminal device 2 and displaying elements thereof at these display areas.

Specifically player characters A1 to A5 belonging to guild G1 and player characters B1 to B5 belonging to guild G2 are displayed as a part of the elements. That is, in this case, an area where player characters A1 to A5 belonging to guild G1 are displayed (main field of guild G1) and an area where player characters B1 to B5 belonging to guild G2 are displayed (main field of guild G2) are mainly defined at the event field F. Then player characters A1 to A5 belonging to guild G1 and player characters B1 to B5 belonging to guild G2 each join together to fight a direct battle with opponent player characters of the opponent guilds.

The main fields of guilds G1 and G2 are made up of sub-fields G1$f$ and G1$b$ and sub-fields G2$f$ and G2$b$, respectively, which are surrounded with dot-and-dash lines in the drawing. In this embodiment, among player characters A1 to A5 belonging to guild G1, three player characters A1 to A3 are arranged at sub-field G1$f$ as forward players and the other player characters A4 and A5 are arranged at the sub-field G1$b$ as back players based on the values of parameters set for the player characters A1 to A5. Similarly, among player characters B1 to B5 belonging to guild G2, three player characters B1 to B3 are arranged at sub-field G2$f$ as forward players and the other player characters B4 and B5 are arranged at the sub-field G2$b$ as back players based on the values of parameters set for the player characters B1 to B5.

In the form of the fighting at this fighting event Ba2, the screen 2a of each terminal device 2 of player characters A1 to A5 in guild G1 shows pallet P. This pallet P is a place where each player character A1 to A5 and B1 to B5 in guilds G1 and G2 decides their "skills" (normal skills and special skills) by random drawing that can be used for attacking of opponent player characters B1 to B5 and A1 to A5 as their elements. This pallet P displays a deck D that is a virtual bundle of cards and a plurality of cards (game media) selected from the deck D.

Each card includes a type of the "skill" or a player character representing it, and a specific item, illustration and letters relating to the skill that are drawn or described thereon. Each card contains information set therefor, including the skill, the attack rate (a point of the skill or activated action; action point (AP) or skill point (skill P)), the defense rate (this may be health point or hit point (HP)), attributes (e.g., colors such as red, green and blue and forms such as fire, water, trees and light), rarity and the like. When the player turns over the cards one by one from the deck D and if three cards 31, 32 and 33 displayed have only one type, attribute or rarity or have a specific combination (combination rank), the effect such as increasing the attack rate and the defense rate of player A1 to A5 will be activated. Then, the skill that is to be activated by the selection or the combination of cards 31, 32 and 33 or their related items being executed 401 and 402 are disposed below the player characters A1 to A5 and B1 to B5, respectively, at the event field F.

Each player character A1 to A5 in guild G1 selects (turns over) cards one by one from the deck D at the pallet P. As a result, a damage done to the opponent and a damage that the player receives can be calculated in accordance with the combination of the skills, attack rates, specific items and defense rates as well as their attributes, rarity and the like set for the cards 31, 32 and 33 when the player attacks player characters B1 to B3 of the opponent guild G2. On the other hand, a similar display is shown on the screen 2*a* of each terminal device 2 of player characters B1 to B5 of guild G2 as well, and they attack player characters A1 to A3 of the opponent guild G1.

HP gauges 61 and 62 for guilds G1 and G2 are displayed above the main field of guilds G1 and G2, respectively. Then the number of times player character A1 to A5, B1 to B5 attacks their opponent player characters continuously (the number of combos) before receiving an attack from the opponent player characters B1 to B5, A1 to A5 is displayed as combo gauges Cm1 and Cm2 in the vicinity of the HP gauges 61 and 62, respectively. When the number of combos displayed in these combo gauges Cm1 and Cm2 reaches a predetermined value or more, the power of a skill used for the opponent player characters B1 to B5, A1 to A5 by player character A1 to A5, B1 to B5 is enhanced, whereby a damage to be done to the opponent player characters increases. Then, the winner or the loser will be determined based on the values of the HP gauges 61 and 62 at the ending time of the fighting.

The following describes the processing by player A1, for example, to invite (solicit) another player to the thus described game. The following exemplifies the case where player A1 invites player C1 or player D1, as another player. Player C1 does not participate in (register as a player) the game but registers as a member with the provider that provides the game. Player D1 does not participate in the game nor the provider (does not register as a player nor as a member). Players C1 and D1 are invited by receiving an invitation message sent from the terminal device 2 (hereinafter this may be called a first terminal device) (specifically from the account at the provider of player A1) operated by player A1 to accounts of players C1 and D1 that are managed by an external service described later. Then, players C1 and D1 operate their terminal devices 2 (hereinafter they may be called second terminal devices) to acquire the invitation message from the external service and can check the contents of the invitation message. The invitation message contains URL (specific information) to specify a landing screen (page) V1 and descriptions to suggest participating in the game (solicitation information). The URL to specify V1 contains tracking code (identification information). The tracking code is provided to discriminate player A1 who operates the terminal device 2 as the origination of the URL from other players, when the terminal devices 2 of players C1 and D1 access the landing screen V1 of the server device 100 based on the URL. Herein, the tracking code is a code issued by an application of the game when the invitation message is transmitted, and after the issuance, the tracking code is held by the application of the game (specifically at the storage device (e.g., RAM 103) of the server device 100). When a terminal device 2 receiving the invitation message accesses the landing screen V1 based on the URL, the server device 100 can obtain the tracking code. This allows the server device 100 to discriminate player A1 from other players based on the tracking code held at the application of the game and tracking codes acquired based on the URL.

Figure 5:
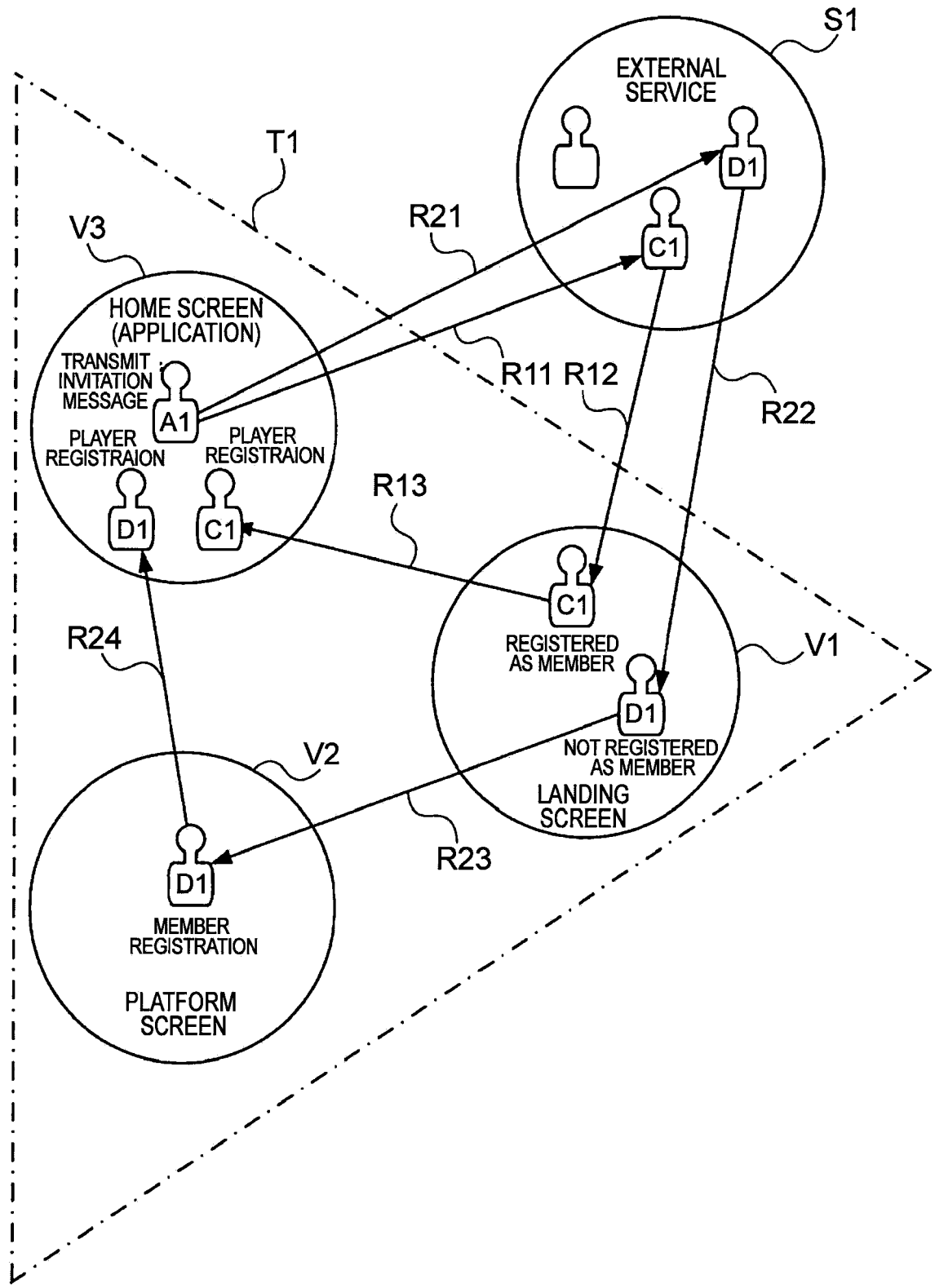
FIG. 5 schematically illustrates the relationships among an invitation message, a landing screen, a platform screen and a home screen according to embodiments of the invention.

Referring firstly to FIG. 5, the following describes relationships of the invitation message, the landing screen V1, a platform screen V2 and a home screen V3. The landing screen V1, the platform screen V2 and the home screen V3 are all displayed on the platform provided by the provider of the game, which are displayed on the terminal devices 2 by the server device 100.

As illustrated in FIG. 5, the landing screen V1, the platform screen V2 and the home screen V3 are associated with each other in a management range T1 of the provider that provides the game. The management range T1 refers to the range of information and processing that the provider can manage in the platform, e.g., including information on registered members, information on provided games (applications), and the processing relating to messages and e-mail among the members, for example. The URL included in the invitation message has a link with the landing screen V1. A link is established at least from the landing screen V1 to the platform screen V2 and the home screen V3, and a link is established from the platform screen V2 to the home screen V3.

External service S1 is a service that is provided outside of the management range T1 of the provider that provides the game. The external service S1 manages messages and e-mail exchanged between information processing terminals including the terminal devices 2 and the like. This means that, the external service S1 may be used so as to work with the message processing in the management range T1, whereby messages and e-mail can be exchanged in and out of the management range T1. Thereby the invitation message can be transmitted from a player (account of the player) who operates a terminal device 2 in the management range T1 to a user (to account of the user) outside of the management range T1. The external service S1 manages the connection of information processing terminals such as the terminal devices 2 to the Internet as well. This means that a user of an information processing terminal such as the terminal device 2 outside of the management range T1 can access the landing screen V1 while using the Internet connection function and the external service S1.

Figure 6:
FIG. 6 illustrates one exemplary landing screen of FIG. 5.

FIG. 6 illustrates one exemplary landing screen V1. The landing screen V1 displays, for example, "To join ○○○ game, register as member prior to registration as player" indicating the necessity of member registration to participate in the game, "To join ○○○ game, register as player" indicating the necessity of player registration, URL "http://www.aaaaaa.co.jp" of the platform screen V2 for member registration, and URL "http://www.aaaaaa.co.jp/bbbb" of the home screen V3 for player registration or the like.

Referring back to FIG. 5, the following describes the flow of procedure where an invitation message is transmitted from a terminal device 2 (first terminal device) operated by player A1 who registers as a player (this means that player A1 registers as a member with the provider as well) of the game to terminal devices 2 (second terminal devices) operated by players C1 and D1, and then players C1 and D1 access the landing screen V1 or the like via the URL included in the invitation message.

Firstly player A1 operates the terminal device 2 to use the external service S1 through the home screen V3 of the aforementioned game, thus transmitting an invitation message to the terminal devices 2 operated by his/her friends (players C1 and D1) (R11, R21).

When the terminal device 2 of player C1 receives the invitation message from player A1, player C1 operates the terminal device 2 to display the invitation message thereon, and clicks the URL included in the invitation message. Then, the terminal device 2 displays the landing screen V1 (R12). Since player C1 already registers as a member with the provider, when player C1 clicks URL "http://www.aaaaaa-.co.jp/bbbb" (see FIG. 6) from which a link is established to the home screen V3, the home screen V3 is displayed, following the processing to check whether player C1 is a member (R13). Then, player C1 performs predetermined operation through the home screen V3 to register as a player, whereby player C1 can participate in (register) the game as a player.

When the terminal device 2 of player D1 receives the invitation message from player A1, player D1 operates the terminal device 2 to display the invitation message thereon, and clicks the URL included in the invitation message. Then, the terminal device 2 displays the landing screen V1 (R22). Since player D1 does not register as a member with the provider (unregistered), when player D1 clicks URL "http://www.aaaaaa.co.jp" (see FIG. 6) from which a link is established to the platform screen V2, the platform screen V2 is displayed (R23). Then player D1 performs predetermined operation through the platform screen V2 to register as a member, whereby player D1 can register as a member with the provider. Then the home screen V3 will be displayed on the screen of the terminal device 2 automatically or through a predetermined operation (R24). Player D1 performs predetermined operation through the home screen V3 to register as a player, whereby player D1 can participate in (register) the game as a player.

Figure 7:
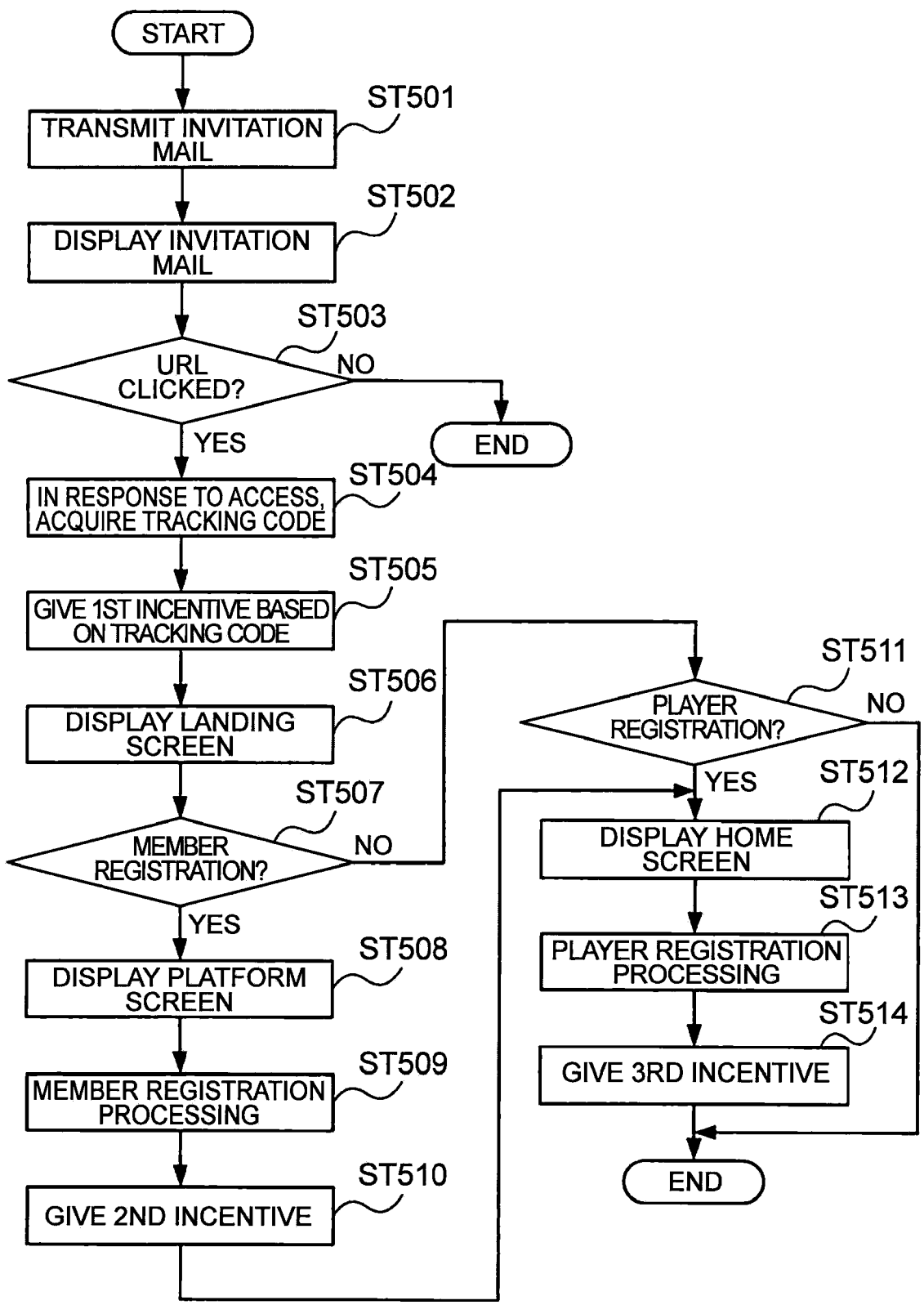
FIG. 7 is a flowchart illustrating exemplary processing to give an incentive according to embodiments of the invention.

Referring next of FIG. 7, the following describes an incentive that is given to the player who transmits an invitation message when access is made to the landing screen V1 based on the invitation message, followed by member registration and player registration of the user or player registration of the user. FIG. 7 is a flowchart illustrating exemplary processing to give the incentives.

A player operates the terminal device 2 (first terminal device) to transmit an invitation message from the player (account of the player) who operates the first terminal device to a predetermined user (account of the user) via the external service S1 outside of the management range T1 (ST501). Then in response to an operation by the predetermined user, a second terminal device displays the invitation message received from the first terminal device at a predetermined display part (ST502). Specifically the player of the first terminal device instructs the server device 100 to transmit an invitation message to a predetermined user of the external service S1 (e.g., a friend on a social networking service (SNS)). Receiving the instruction, the server device 100 transmits the invitation message to the predetermined user. When the predetermined user registers in advance, the invitation message may be transmitted to the second terminal device via the external service S1, or may be stored in an inbox of the predetermined user of the external service S1. Then, the predetermined user operates the second terminal device to check the contents of the invitation message transmitted or stored as stated above. That is, the predetermined user is allowed to visually identify (view) the contents of the invitation to the game and the URL. Herein, the player and the predetermined user can receive a service of the provider and the external service S1 via their accounts. This means that, as long as the terminal devices 2 can access the provider and the external service S1, the terminal devices 2 that the player and the predetermined user operate may be different terminal devices 2 every time they receive a service of the invitation message.

Next, the second terminal device determines whether the URL is clicked or not (ST 503). When the predetermined user decides to participate in the game, the user operates the second terminal device to click the URL included in the invitation message that is displayed at the display part of the second terminal device. In response to this click operation, the second terminal device determines that the URL is clicked (ST503: YES). On the other hand, when the predetermined user does not express interest in the game, the predetermined user operates to close the invitation message without clicking the URL. In response to this operation, the second terminal device determines that the URL is not clicked (ST503: NO). In this case, this procedure ends. That is, the player of the first terminal device will not receive any incentive.

When the above URL is clicked (ST503: YES), the second terminal device accesses the landing screen V1 provided by the server device 100 using the Internet connection function of the external service S1, for example. In response to the access to the landing screen V1, the server device 100 acquires a tracking code (code to identify the player who operates the first terminal device) included in the invitation message from the second terminal device (ST504).

Next, the server device 100 gives a first incentive to the player who is identified with the tracking code (ST505). That is, the first incentive is given when an access is made to the landing screen V1 based on the invitation message. This can increase a coin, an item or the like in the game of the player who operates the first terminal device, which is managed by the server device 100.

Next, the server device 100 performs processing to display the landing screen V1 on the second terminal device (ST506). The predetermined user visually identifies the display of the landing screen V1 that is displayed at the display part of the second terminal device, and selects whether to register as a member or to register as a player depending on whether he/she registers or not as a member with the provider. Based on the selection, information indicating which one of the two URLs is clicked by the predetermined user, for example, is transmitted from the second terminal device to the server device 100.

The server device 100 determines based on the information acquired from the second terminal device whether instruction to register as a member is issued or not from the predetermined user (ST507).

When the acquired information indicates that the URL to access the platform screen V2 is clicked, the server device 100 determines that instruction of member registration is issued (ST507: YES), and the server device 100 performs processing to display the platform screen V2 at the display part of the second terminal device (ST508). Then, the predetermined user performs a predetermined operation through the platform screen V2 displayed at the display part of the second terminal device, thus registering as a member (ST509). In this way, the server device 100 registers the predetermined user as a member of the provider.

When member registration ends in this way, the server device 100 gives a second incentive to the player who operates the first terminal device (ST510). That is, the second incentive is given when member registration is performed based on the invitation message. The server device 100 can give the incentive to the player who operates the first terminal device using the tracking code acquired at Step S504. This can increase a coin, an item or the like in the game of the player who operates the first terminal device, which is managed by the server device 100.

When it is determined that member registration is not performed at the processing at Step S507 (ST507: NO), the server device 100 determines whether instruction of player registration is issued or not based on the acquired information from the second terminal device (ST511). When the information acquired from the second terminal device does not indicate an instruction of member registration nor an instruction of player registration, e.g., indicates that the landing screen V1 is closed without clicking a URL (ST511: NO), the server device 100 performs processing to start the processing of the game and ends this processing.

When the acquired information indicates that the URL to access the home screen V3 is clicked, i.e., when it is determined as an instruction of player registration (ST511: YES), or when the second incentive is given at the above Step S510, the server device 100 performs processing to display the home screen V3 at the display part of the second terminal device (ST512). Then the predetermined user performs predetermined operation through the home screen V3 that is displayed at the display part of the second terminal device, thus registering as a player (ST513). In this way, the server device 100 registers the predetermined user as a player of the game. Then, the predetermined user is allowed to participate in the game.

When the player registration processing of the predetermined user ends in this way, the server device 100 gives the third incentive to the players who operate the first terminal device and the second terminal device (ST514). That is, the third incentive is given when player registration is performed based on the invitation message. This can increase a coin, an item or the like in the game of the players who operate the first terminal device and the second terminal device, which is managed by the server device 100.

The present embodiment describes the case where the third incentive is given to the players who operate the first and the second terminal devices. For instance, when the game is configured to give a newly-registration incentive when a new player is registered, the third incentive may be given to the player who operates the first terminal device only. In such a configuration as well, the third incentive may be given to each of the players who operate the first and the second terminal devices. Then the server device 100 ends this processing.

According to the thus configured method for controlling the server device 100, server device 100, recording medium and game system 1, a second terminal device receives (acquires) an invitation message suggesting of participation to the game and containing a URL specifying the landing screen V1 in association with the platform screen V2 and the home screen V3, and simply accesses the landing screen V1 based on the URL through the operation of the player of the second terminal device, whereby a first incentive can be given to the player who operates the first terminal device. In this way, motivation for the player to transmit an invitation message can be increased, and so the number of players who participate in the game will increase and the game and the platform that provides the game can be activated.

The URL of the landing screen V1 and a tracking code included in the invitation message are associated with each other. This allows, when the second terminal device accesses the landing screen V1, the server device 100 to distinguish player A1 who operates the first terminal device from which the invitation message is transmitted to the second terminal device using the tracking code from the other players. As a result, when the second terminal devices accesses the landing screen V1 based on the invitation message, then the first incentive can be securely given to player A1 who transmits the invitation message and operates the first terminal device.

In the above embodiment, the incentive is given to the player who operates the first terminal device based on the operation by the player of the second terminal device, including access operation to the landing screen V1. Then, for example, the incentive can be changed gradually in accordance with the degree of importance of the operation.

For instance, the first incentive may be the smallest because it is given to the access operation to the landing screen V1. The second incentive may be the largest because it is given to the operation that becomes a great advantage for the provider that is member registration. The third incentive may be at the medium level between the first and the second incentives because it is given to the operation to register as a player of the game.

The number of times of the first to the third incentives may be limited within predetermined duration, and the limitation number of times of the incentives can be changed for every predetermined duration. For instance, the number of times of each of the first to the third incentives that can be given in a predetermined one day is limited to 10 times, and in the next day, the number of times for each of the first to the third incentives is limited to 5 times. In this way, the number of times of the incentives that can be given is limited within predetermined duration, and the limitation number of times thereof is changed for every predetermined duration, whereby a predetermined event can be tied to the predetermined duration, for example, which can lead to an increase in the number of invitation messages to be transmitted. Players may be informed of the number of times of incentives given or their contents by a predetermined method, whereby the players can be encouraged to transmit invitation messages.

The above embodiment describes the case where an invitation message is transmitted to a predetermined user (to the account of the user) via the external service S1. The invention disclosed herein is not limited to this, and the processing relating to giving of an incentive as stated above may be performed also in the case where a message transmission/reception service in the management range T1 is used without using the external service S1.

The above embodiment describes the case where the URL to specify the landing screen V1 (specific information) and suggestion of participating in the game (solicitation information) are transmitted using an invitation message to the terminal device 2 of a predetermined user. The invention disclosed herein is not limited to this, and the form for transmission is not limited to a message as long as it can transmit invitation information including solicitation information and specific information at least to a predetermined user, and invitation mail (e-mail) may be used, for example.

The above embodiment describes the case where the first to the third incentives are given to player A1 when players C1 and D1 access the landing screen V1, they register as members and register as players, respectively, and incentives given are not limited to them. For instance, there is a game that can be played without the necessity of member registration or player registration, or a game that can be played without the necessity of member registration or player registration during a trial period. In such a case, an incentive may be given to player A1 when another player participates in (register) the game based on invitation message. An incentive may be given to player A1 when the player invited achieves a specific matter that is predetermined in the game (e.g., the player invited reaches a predetermined level, participates in a predetermined event or acquires a predetermined item).

The above embodiment describes the case where players C1 and D1 can access the platform screen V2 and the home screen V3 via the landing screen V1. The invention disclosed herein is not limited to this, and embodiments may be configured to access the home screen V3 at least via the landing screen V1.

The present embodiment describes players C1 and D1 as examples of the players to which an invitation message is transmitted. The invention disclosed herein is not limited to this, and an invitation message may be transmitted to player E1 (dormant player) who registers as a member with the provider and registers as a player of the game but has not participate in the game for a certain period, and the incentive giving processing may be applied also when such a player E1 accesses the landing screen V1 based on the invitation message.

As stated above, the invention disclosed herein is not limited to the above embodiment and the already-described modified examples, and may be modified variously as long as its gist is not changed. For instance, the configuration of the server device 100 illustrated in FIG. 1 may be applied to the client computers 21 and the mobile terminals 22 as the terminal devices 2 as well, which are different in ability in processing or the like. In other words, a client computer 21 or a mobile terminal 22 may be used as the server device 100. That is, any computer that is connected via the network 200 may function as the server device.

The server device 100 may comprise a mass-storage device such as a hard disk or a SSD, which is configured so as to fulfill the functions similar to the ROM 102, the RAM 103, the external memory 106, a memory device loaded in the slot drive 108 and the like. Such a storage device may or may not have a redundant architecture using RAID or the like. This may not be connected to the arithmetic processing unit 101 via the transmission line 120, and may be connected to another external device via the network 200 as a part of cloud computing.

A network interface at the server device 100 and the terminal devices 2 may be a wireless LAN device or a wired LAN device, which may be installed internally or may be of an external device type such as a LAN card. The terminal devices 2 may be a game console that can be connected to the network 200 or may be an online karaoke device, for example.

The above embodiment is applied to a fighting game comprising fighting events Ba1 and Ba2 that is described referring to FIGS. 3 and 4, and the invention disclosed herein is not limited to such a fighting game and is applicable to various types of games.

As stated above, the server device, the method for controlling the same, the recording medium and the game system can enhance motivation of a player to transmit invitation information to invite another player to a social game, whereby the social game and a platform that provides the social game can be activated. In this way, embodiments can be used widely and effectively for general games that are delivered, provided and executed especially in the server-client type network configuration (especially including elements of a social game), general techniques relating to software and hardware for the delivery, provision and execution of the games, and the actions of their designing, manufacturing, sales and the like.

DESCRIPTION OF REFERENCE NUMERALS 1 game system
2 terminal device
2a, 2b screen
21 client computer (terminal device)
22 mobile terminal (terminal device)
100 server device
S1 external service
T1 management range
V1 landing screen
V2 platform screen
V3 home screen

What is claimed is:

1. A method for controlling a server device that provides a game, in which a plurality of players can participate, and that is connected to terminal devices operated by the players via a communication line, comprising:
  by the server device, responsive to instruction from a first terminal device, transmitting an invitation information to a second terminal device, wherein the invitation information includes a predetermined information identifying a first player who operates the first terminal device;
  by the server device, transmitting screen information for playing the game to the second terminal device when it is determined that a landing page is closed based on operation by a second player who operates the second terminal device, wherein the second player is registered as a member with a provider providing the game;
  by the server device acquiring, from the second terminal device, the predetermined information identifying the first player provided in the invitation information, when it is determined that the second player achieves a specific matter that is predetermined in the game based on the invitation information;
  by the server device, after the predetermined information was acquired, identifying the first player based on the predetermined information and giving a first incentive to the first player, wherein giving the first incentive to the first player comprises increasing a number of incentives retained by the first player in a game storage of the first terminal device operated by the first player, and
  by the server device, informing the first terminal device of at least one of contents of any awarded incentive and a number of times that any awarded incentive is given.

2. The method for controlling according to claim 1, further comprising:
  limiting a number of times that the first incentive can be given in a predetermined duration and changing a limitation number of times that an incentive can be given for every predetermined duration.

3. The method for controlling according to claim 2, wherein the predetermined duration is tied to an event in the game.

4. The method for controlling according to claim 3, further comprising:
  by the server device, responsive to said instruction from the first terminal device, transmitting said invitation information to a third terminal device, wherein the invitation information includes said predetermined information to at least identify the first player;
  by the server device, transmitting the screen information for playing the game to the third terminal device when it is determined that the landing page is closed based on operation by a third player who operates the third terminal device, wherein the third player is registered as the member with the provider providing the game;
  by the server device, acquiring the predetermined information from the third terminal device when it is determined that the third player achieves the specific matter that is predetermined in the game; and
  by the server device, after the predetermined information was acquired from the third terminal device, identifying the first player based on the predetermined information and giving a second incentive as an incentive for the first player.

5. The method for controlling according to claim 4, further comprising:
by the server device, giving a third incentive as further incentive for the first player when it is determined that a further player is registered as the player with the game based on an operation by the further player, wherein the third incentive is larger than the second incentive.

6. The method for controlling according to claim 2, further comprising:
by the server device, responsive to said instruction from the first terminal device, transmitting said invitation information to a third terminal device, wherein the invitation information includes said predetermined information to at least identify the first player;
by the server device, transmitting the screen information for playing the game to the third terminal device when it is determined that the landing page is closed based on operation by a third player who operates the third terminal device, wherein the third player is registered as the member with the provider providing the game;
by the server device, acquiring the predetermined information from the third terminal device when it is determined that the third player achieves the specific matter that is predetermined in the game; and
by the server device, after the predetermined information was acquired from the third terminal device, identifying the first player based on the predetermined information and giving a second incentive as an incentive for the first player.

7. The method for controlling according to claim 6, further comprising:
by the server device, giving a third incentive as further incentive for the first player when it is determined that a further player is registered as the player with the game based on an operation by the further player, wherein the third incentive is larger than the second incentive.

8. The method for controlling according to claim 1, further comprising:
by the server device, responsive to said instruction from the first terminal device, transmitting said invitation information to a third terminal device, wherein the invitation information includes said predetermined information to at least identify the first player;
by the server device, transmitting the screen information for playing the game to the third terminal device when it is determined that the landing page is closed based on operation by a third player who operates the third terminal device, wherein the third player is registered as the member with the provider providing the game;
by the server device, acquiring the predetermined information from the third terminal device when it is determined that the third player achieves the specific matter that is predetermined in the game; and
by the server device, after the predetermined information was acquired from the third terminal device, identifying the first player based on the predetermined information and giving a second incentive as an incentive for the first player.

9. The method for controlling according to claim 8, further comprising:
by the server device, giving a third incentive as further incentive for the first player when it is determined that a fourth player is registered as the player with the game based on an operation by the fourth player, wherein the third incentive is larger than the second incentive.

10. The method for controlling according to claim 1, further comprising:
by the server device, transmitting the invitation information to the second terminal device when it is determined that the second player does not participate in the game for a certain period.

11. A server device that provides a game, in which a plurality of players can participate, and that is connected to terminal devices operated by the players via a communication line, the server device being operative to:
responsive to instruction from a first terminal device, transmit an invitation information to a second terminal device, wherein the invitation information includes a predetermined information to at least identify a first player who operates the first terminal device;
responsive to a determination that a landing page has been closed on the second terminal device based on operation by a second player who operates the second terminal device, transmit screen information for playing the game to the second terminal device, wherein the second player is registered as a member with a provider providing the game;
acquire from the second terminal device, the predetermined information identifying the first player provided in the invitation information, when it is determined that the second player achieves a specific matter that is predetermined in the game based on the invitation information;
after the predetermined information was acquired, identify the first player based on the predetermined information and to give a first incentive to the first player, wherein giving the first incentive to the first player comprises increasing a number of incentives retained by the first player in a game storage of the first terminal device operated by the first player, and
inform the first terminal device of at least one of contents of any awarded incentive and a number of times that any awarded incentive is given.

12. The server device according to claim 11, further being operative to:
limit a number of times that any awarded incentive can be given in a predetermined duration; and
change a limitation number of times that any awarded incentive can be given for every predetermined duration.

13. The server device according to claim 12, wherein the predetermined duration is tied to an event in the game.

14. The server device according to claim 11, further being operative to:
responsive to said instruction from the first terminal device, transmit said invitation information to a third terminal device, wherein the invitation information includes said predetermined information to at least identify the first player;
transmit the screen information for playing the game to the third terminal device when it is determined that the landing page is closed based on operation by a third player who operates the third terminal device, wherein the third player is registered as the member with the provider providing the game;
acquire the predetermined information from the third terminal device when it is determined that the third player achieves the specific matter that is predetermined in the game; and after the predetermined information was acquired from the third terminal device, identify the first player based on the predetermined information and giving a second incentive as an incentive for the first player.

15. A non-transitory computer-readable recording medium having a program that can be readable by a computer that provides a game, in which a plurality of players can participate, and that is connected to terminal devices operated by the players via a communication line and which program, when executed by said computer, provides an incentive giving function that:
responsive to instruction from a first terminal device, transmits an invitation information to a second terminal device, wherein the invitation information includes a predetermined information to at least identify a first player who operates the first terminal device;
transmits the screen information for playing the game to the second terminal device when it is determined that a landing page is closed based on operation by a second player who operates the second terminal device, wherein the second player is registered as a member with a provider providing the game;
acquires the second terminal device, the predetermined information identifying the first player provided in the invitation information, when it is determined that the second player achieves a specific matter that is predetermined in the game based on the invitation information;
after the predetermined information was acquired, identifies the first player based on the predetermined information and gives a first incentive to the first player, wherein giving the first incentive to the first player comprises increasing a number of incentives retained by the first player in a game storage of the first terminal device operated by the first player, and
informs the first terminal device of at least one of contents of any awarded incentive and a number of times that any awarded incentive is given.

16. The non-transitory computer-readable recording medium according to claim 15, wherein the program provides the incentive giving function that:
limits a number of times that any incentive can be given in a predetermined duration; and
changes a limitation number of times that any incentive can be given for every predetermined duration.

17. The non-transitory computer-readable recording medium according to claim 16, wherein the predetermined duration is tied to an event in the game.

18. The non-transitory computer-readable recording medium according to claim 15, wherein the program provides the incentive giving function that:
responsive to said instruction from the first terminal device, transmits said invitation information to a third terminal device, wherein the invitation information includes said predetermined information to at least identify the first player;
transmits the screen information for playing the game to the third terminal device when it is determined that the landing page is closed based on operation by a third player who operates the third terminal device, wherein the third player is registered as the member with the provider providing the game;
acquires the predetermined information from the third terminal device when it is determined that the third player achieves the specific matter that is predetermined in the game; and
after the predetermined information was acquired from the third terminal device, identifies the first player based on the predetermined information and giving a second incentive as an incentive for the first player.

19. A method for controlling a server device that provides a game, in which a plurality of players can participate, and that is connected to terminal devices operated by the players via a communication line, comprising:
by the server device, responsive to instruction from a first terminal device, transmitting an invitation information to a second terminal device, wherein the invitation information includes a predetermined information identifying a first player who operates the first terminal device;
by the server device, in a case in which two conditions are true, wherein a first condition of the two conditions is that the game can be played without registering as a member with a provider that provides the game and a second condition of the two conditions is that the game can be played without registering as a player with the game:
determining that a second player who operates the second terminal device participates in the game based on the invitation information, and
after and as a result of such determination, acquiring, from the second terminal device, the predetermined information identifying the first player provided in the invitation information;
by the server device, after the predetermined information was acquired from the second terminal, identifying the first player based on the predetermined information acquired from the second device, creating a new association between the second player and the first player, and giving a first incentive to the first player, wherein giving the first incentive to the first player comprises increasing a number of incentives retained by the first player in a game storage of the first terminal device operated by the first player,
awarding an additional incentive to the first player based on further gameplay of the second player, said gameplay comprising an achievement of a specific matter predetermined in the game, and
by the server device, informing the first terminal device of at least one of contents of any awarded incentive and a number of times that any awarded incentive is given.

20. The method for controlling the server device of claim 19, wherein the first condition further comprises that the game can be played without providing a member registration instruction to the provider and the second condition further comprises that the game can be played without providing a player registration instruction to the provider.

21. A server device that provides a game, in which a plurality of players can participate, and that is connected to terminal devices operated by the players via a communication line, the server device being operative to:
responsive to instruction from a first terminal device, transmit an invitation information to a second terminal device, wherein the invitation information includes a predetermined information to at least identify a first player who operates the first terminal device;
in a case in which two conditions are true, wherein a first condition of the two conditions is that the game can be played without registering as a member with a provider that provides the game and a second condition of the two conditions is that the game can be played without registering as the player with the game:

determine that a second player who operates the second terminal device participates in the game based on the invitation information, and after and as a result of such determination, acquire from the second terminal device, the predetermined information identifying the first player provided in the invitation information;

after the predetermined information was acquired from the second terminal device, identify the first player based on the predetermined information acquired from the second terminal device, create a new association between the second player and the first player, and give a first incentive to the first player, wherein giving the first incentive to the first player comprises increasing a number of incentives retained by the first player in a game storage of the first terminal device operated by the first player, award an additional incentive to the first player based on further gameplay of the second player, said gameplay comprising an achievement of a specific matter predetermined in the game, and inform the first terminal device of at least one of contents of any awarded incentive and a number of times that any awarded incentive is given.

22. The server device that provides the game of claim 21, wherein the first condition further comprises that the game can be played without providing a member registration instruction to the provider and the second condition further comprises that the game can be played without providing a player registration instruction to the provider.

23. A non-transitory computer-readable recording medium having a program that can be readable by a computer that provides a game, in which a plurality of players can participate, and that is connected to terminal devices operated by the players via a communication line and which program, when executed by said computer, provides an incentive giving function that:

responsive to instruction from a first terminal device, transmits an invitation information to a second terminal device, wherein the invitation information includes a predetermined information to at least identify a first player who operates the first terminal device;

in a case in which two conditions are true, wherein a first condition of the two conditions is that the game can be played without registering as a member with a provider that provides the game and a second condition of the two conditions is that the game can be played without registering as the player with the game:

determines that a second player who operates the second terminal device participates in the game based on the invitation information, and after and as a result of such determination, acquires the second terminal device, the predetermined information identifying the first player provided in the invitation information;

after the predetermined information was acquired from the second terminal device, identifies the first player based on the predetermined information acquired from the second terminal device, creates a new association between the second player and the first player, and gives a first incentive to the first player, wherein giving the first incentive to the first player comprises increasing a number of incentives retained by the first player in a game storage of the first terminal device operated by the first player, awards an additional incentive to the first player based on further gameplay of the second player, said gameplay comprising an achievement of a specific matter predetermined in the game, and informs the first terminal device of at least one of contents of any awarded incentive and a number of times that any awarded incentive is given.

24. The non-transitory computer-readable recording medium of claim 23, wherein the first condition further comprises that the game can be played without providing a member registration instruction to the provider and the second condition further comprises that the game can be played without providing a player registration instruction to the provider.

* * * * *